United States Patent [19]

Yanagi et al.

[11] Patent Number: 5,265,139
[45] Date of Patent: Nov. 23, 1993

[54] FUEL ASSEMBLY

[75] Inventors: Yoshihiko Yanagi; Junjiro Nakajima; Kenji Kanamori, all of Hitachi; Hajime Umehara, Katsuta; Yasuhiro Aizawa, Hitachi; Toraki Sakuma, Hitachi; Hiromasa Hirakawa, Hitachi; Hideaki Ishizaki, Mito, all of Japan

[73] Assignees: Hitachi, Ltd., Tokyo; Hitachi Engineering Co., Ltd., Hitachi, both of Japan

[21] Appl. No.: 840,939

[22] Filed: Feb. 25, 1992

[30] Foreign Application Priority Data

Feb. 25, 1991 [JP] Japan .................................. 3-29789
Jun. 14, 1991 [JP] Japan .................................. 3-143409

[51] Int. Cl.$^5$ ................................................ G21C 3/32
[52] U.S. Cl. ....................................... 376/435; 376/443; 376/173
[58] Field of Search ............... 376/443, 435, 173, 422, 376/444, 439, 448; 926/DIG. 60, DIG. 94

[56] References Cited

U.S. PATENT DOCUMENTS 4,749,544  6/1988  Crowther ............................ 376/443
4,970,047  11/1990 Ueda et al. .......................... 376/443
5,009,840  4/1991  Ued et al. ........................... 376/435

Primary Examiner—Donald P. Walsh
Assistant Examiner—Meena Chelliah
Attorney, Agent, or Firm—Antonelli, Terry Stout & Kraus

[57] ABSTRACT

A fuel assembly comprises a plurality of fuel rods supported by an upper tie plate and a lower tie plate respectively at each of upper end portion ad lower end portion, and a channel box surrounding a bundle of the fuel rods and the lower tie plate. The fuel assembly forms a natural uranium region at lower end portion of effective fuel length portion. A wall thickness at a lower thick wall region of the channel box is thicker than the wall thickness at a region disposed upwardly from the lower thick wall region and between corner portions of the channel box. An upper end of the lower thick wall region is disposed from an upper side of the lower tie plate and downwardly from an upper end of the natural uranium region. A wall thickness at the corner portion of the channel box is thicker than the wall thickness at a middle portion of the side wall between the corner positions at the region locating upward from the lower thick wall region. The fuel assembly is able to reduce stresses caused in the channel box during an earthquake, and, is able to improve fuel economy.

14 Claims, 10 Drawing Sheets

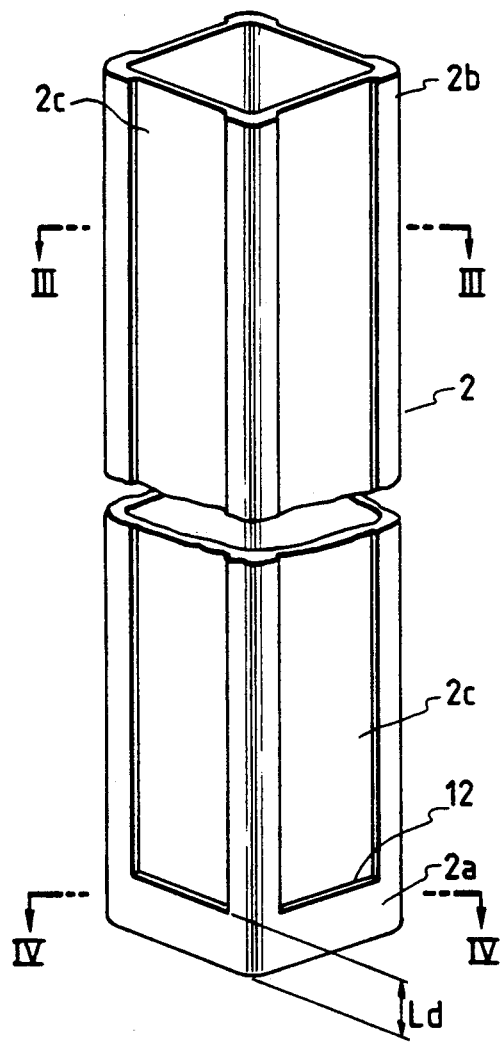
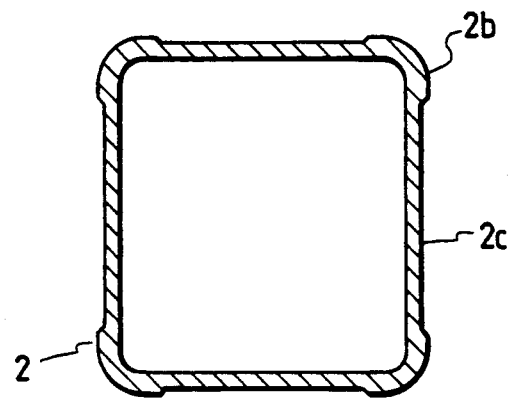
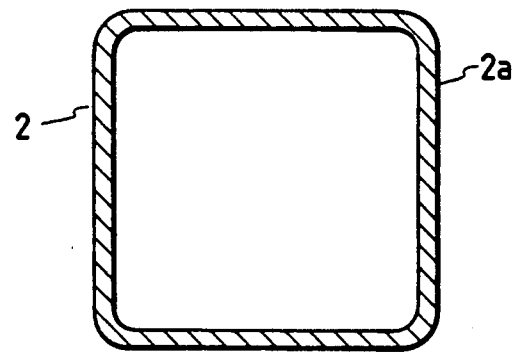

FUEL ASSEMBLY

BACKGROUND OF THE INVENTION

The present invention relates to a fuel assembly, especially a fuel assembly for boiling water reactors.

A conventional fuel assembly for the boiling water reactor comprises a plurality of fuel rods, water rods arranged among the fuel rods, an upper tie plate and a lower tie plate both of which respectively supports each of the fuel rods and the water rods at their upper end and lower end, fuel spacers which maintain mutual intervals between the fuel rods and the water rods with a designated width, and a channel box surrounding a bundle of the fuel rods. The channel box is a long rectangular pipe made of zirconium. The channel box has such functions as (1) flowing a coolant in each of the fuel assembly uniformly, (2) forming a guide plane for both inserting and withdrawing operation of control rods among the fuel rods, and (3) maintaining rigidity and facilitating handling of the fuel assembly.

During operation of the nuclear reactor, the channel box deforms expanding outward by pressure difference between interior and exterior of the channel box 2 and neutron irradiation. The previously described deformation has a possibility to cause troubles in both inserting and withdrawing operation of the control rod by reducing intervals between the channel box and the control rod. Further, the deformation has a possibility to disturb supply of the coolant among the fuel rods by increasing a gap between the channel box and the lower tie plate.

Accordingly, the deformation is conventionally suppressed by sufficiently thickening of the wall of the channel box and leakage flow is regulated by furnishing a plate spring between the channel box and the lower tie plate (FIGS. 1 and 2 in JP-A-54-124183 (1979)). And, there is a restriction in the period of use of the channel box, for example, recycling use of the channel box obtained by disassembling of spent fuels are avoided.

But, in view of neutron economy, reducing a volume fraction of structural material in the reactor core by thinning of the wall of the channel box as possible is preferable. Moreover, in view of reducing radioactive waste, using of the channel box in the reactor core as long as possible is preferable. Recycling use of used channel box is one of the methods for extensional use of the channel box (U.S. Pat. No. 4,988,476).

Currently, using of the fuel assembly to higher burn up has been progressing. Consequently, the channel box is also used for a longer period than a channel box of a conventional fuel assembly. The longer use of the channel box causes increasing of the deformation of the channel box. Further, lowered spring force of the plate spring for regulating the leakage flow between the channel box and the lower tie plate by extension of the using period has a possibility to deteriorate the previously described function of the leakage flow regulation.

Due to the above described background, structures of the channel boxes which are durable for long period usage by suppressing the deformation without much increasing of the volume of the channel box are disclosed in JP-B-1-13075 (1989), U.S. Pat. Nos. 4,749,543 and 4,749,544. In accordance with the above disclosed channel boxes, the wall thickness at corner portion where the intense stress is generated in the cross section by the pressure difference between interior and exterior of the channel box is thickened, and the wall thickness at other region where bears a relatively weak stress is thinned.

The structure of the channel box which is able to regulate the previously described leakage flow has a thick wall region only at the lower end portion of the channel box for increasing the rigidity as disclosed, for example, in U.S. Pat. No. 3,715,274. Consequently, the deformation at the lower end portion of the channel box is suppressed.

The channel box having thick wall region at the corner portion, thin wall region at middle of side wall portion between the corner portions, and thick wall region all through the circumference at the lower end portion is disclosed in JP-A-1-227991 (1989). The thick wall region at the lower end portion of the channel box occupies a space from the lower end of the channel box to a position fitting with the lower tie plate, that is, the same level as the upside of the lower tie plate.

SUMMARY OF THE INVENTION

The object of the present invention is to provide a fuel assembly which is able to reduce a force generated in an earthquake and to improve fuel economy.

The feature of the present invention is that the wall thickness at the lower portion of the channel box is thicker than the wall thickness at the region above the lower thick wall region and between the corner portions of the channel box, and that the upper end of the lower thick wall region locates at a level above the upperside of the lower tie plate and below an upper end of a natural uranium region which is arranged at the lower portion of an effective fuel length in the fuel rod.

Owing to the location of the upper end of the lower thick wall region above the upside of the lower tie plate, a stress generated at the channel box when the lower tie plate collides against the channel box in an earthquake is reduced. Especially, stress concentration to a part where wall thickness alters at the vicinity of the upper end of the lower thick wall region is moderated. Moreover, the upper end of the lower thick wall region locates below the upper end of the natural uranium region, and consequently, less neutrons are absorbed and improvement of neutron utilization factor, which relates to improvement of fuel economy, is realized. Especially, when the upper end of the lower thick wall region locates between the upper and lower ends of the natural uranium region, a quantity of moderator is decreased by much existence of the thick wall material and moderating effect to the neutrons is reduced. Accordingly, a quantity of fast neutrons in the natural uranium region is increased and a conversion ratio of U-238 to fissile plutonium is increased. The above described effect increases the fuel economy. Formation of the lower thick wall region reduces the deformation at the lower portion of the channel box during the reactor operation. Consequently, the coolant leakage flow between the channel box and the lower tie plate can be remarkably decreased.

Another feature of the present invention is that a thick wall region is farther formed at the upper portion of the channel box, and that the wall thickness of the upper thick wall region is thicker than the wall thickness at the region vertically between the upper thick wall region and the lower thick wall region and horizontally between the corner regions of the channel box.

Accordingly, a channel spacer can be installed at the upper thick wall region, and consequently, the stress generated at the channel spacer fixing portion in an earthquake can be reduced.

BRIEF DESCRIPTION OF THE DRAWINGS

FIG. 2 is a perspective view of the channel box in FIG. 1, FIG. 3 is a cross section taken on line III—III of FIG. 2, FIG. 4 is a cross section taken on line IV—IV of FIG. 2.

DETAILED DESCRIPTION OF THE PREFERRED EMBODIMENTS

Figure 1:
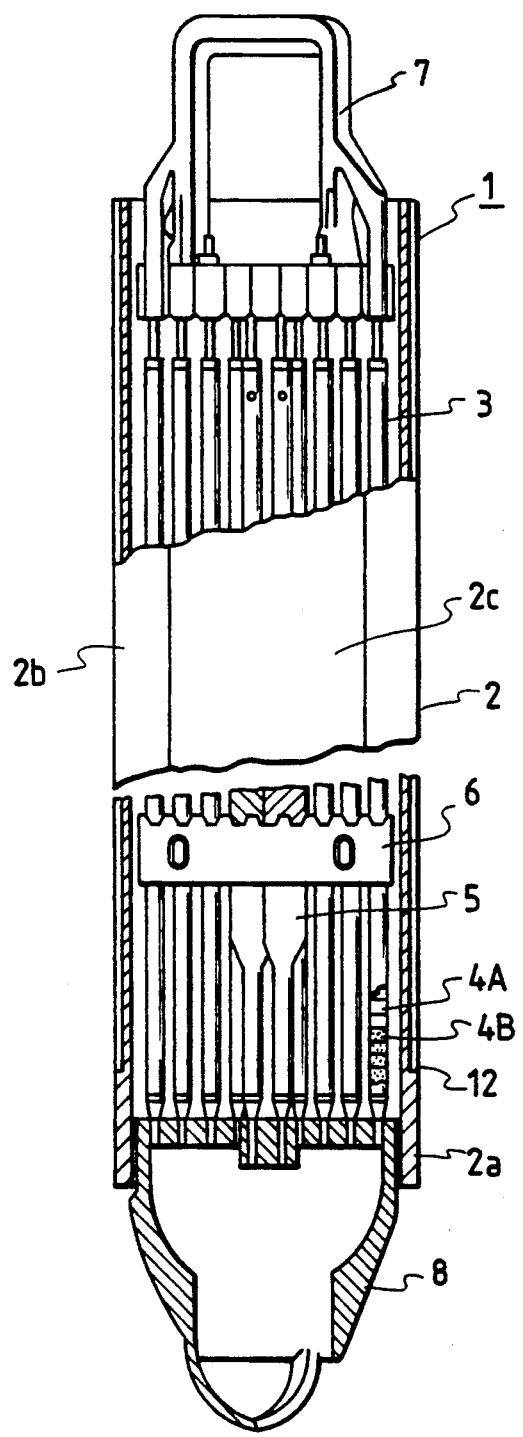
FIG. 1 is a vertical cross section of a fuel assembly relating to a preferable embodiment of the present invention.

A fuel assembly which is a preferable embodiment of the present invention applied to boiling water reactors is explained referring to FIG. 1.

The fuel assembly 1 of the present embodiment comprises a channel box 2, a plurality of fuel rods 3, a plurality of water rods 5, a plurality of fuel spacers 6, the upper tie plate 7, and the lower tie plate 8. The water rods are arranged among the fuel rods 3. Each of the upper and lower ends of the fuel rods 3 and the water rods 5 are supported by the upper tie plate 7 and the lower tie plate 8 respectively. A plurality of fuel spacers 6 are arranged in an axial direction of the fuel assembly and maintain mutual intervals among the fuel rods 3 in a designated width. The upper end of the channel box 2 is fixed to the upper tie plate 7 with screws (not shown in the figure) of a channel fastener, and the lower end of the channel box surrounds the lower tie plate 8. The upper portion of the lower tie plate 8 is inserted in the channel box 2. All of the fuel rods 3 bundled with the fuel spacers 6 are contained in the channel box.

In the fuel assembly 1, the fuel rods 3 are arranged in 9 rows by 9 columns, and the water rods 5 are arranged in the cross sectional central region. The fuel assembly 1 is able to achieve high burn up to 45 Gwd/t.

Spaces formed among the fuel rods 3 in the channel box 2 are paths of a coolant. When the fuel assembly 1 is loaded in the reactor core, the coolant supplied through the lower tie plate 8 enters the above described coolant paths. During ascending the coolant paths, the coolant is heated by the fuel rods 3 and changes to steam. The coolant including the steam exits the fuel assembly outside through the upper tie plate 7.

The fuel rod 3 contains a plurality of fuel pellets in a hermetically sealed cladding tube. The using fuel pellets are roughly divided into two kinds. The one is a fuel pellet 4A made of enriched uranium. The other one is a fuel pellet 4B made of natural uranium. A region where the fuel pellets are inserted is called an effective fuel length region. The fuel pellets 4B are inserted at the axial upper end and the axial lower end of the effective fuel length region as disclosed in U.S. Pat. No. 5,008,070. The fuel pellets 4A are inserted in a region between the inserted regions of the fuel pellets 4B in the axial direction of the effective fuel length region. The axial length of the inserted region of the fuel pellets 4B at the upper end portion of the effective fuel length region is 2/24 (about 30.8 cm) of the axial full length of the effective fuel length region. The axial length of the inserted region of the fuel pellets 4B at the lower end portion of the effective fuel length region is 1/24 (about 15.4 cm) of the above described axial full length.

The channel box 2 has a shape illustrated in FIG. 2. That is, the channel box 2 is a pipe having a rectangular cross section. The channel box 2 has thicker walls at the corner portion 2b than walls at middle portion 2c between the corner portion 2b is almost horizontal cross sections except the axially lower end portion 2a (FIG. 3). The shape illustrated in FIG. 3 is the same as the channel box disclosed in JP-B-1-13075 (1989). A thick wall region at the lower end portion 2a of the channel box 2 has an uniform and the same wall thickness as the corner portion 2b all through its cross sectional circumference as illustrated in FIG. 4. The corner portion 2b preferably has the wall thickness of about 1.4–1.7 times of the wall thickness at the middle portion of the side wall 2c in a relation with stresses and deformation generated at the channel box 2. The step portion 12 is formed at the upper end of the lower thick wall region 2a, that is, at a boundary between the lower thick wall region 2a and the thin middle region 2c of the side wall. The lower end of the channel box 2 locates or is disposed below the upperside of the lower tie plate 8. The step portion 12 is disposed above the upperside of the lower tie plate 8, but below the upper end of the natural uranium region (the region where the fuel pellets 4B are inserted) at the lower end portion of the effective fuel length region.

A finger spring which has been used in a conventional fuel assembly for suppression of coolant leakage between the channel box and the lower tie plate is not used in the fuel assembly 1 of the present embodiment. The reason is that the lower thick wall region 2a is furnished.

Next, the location of the step portion 12 in the axial direction of the fuel assembly is explained.

Figure 5:
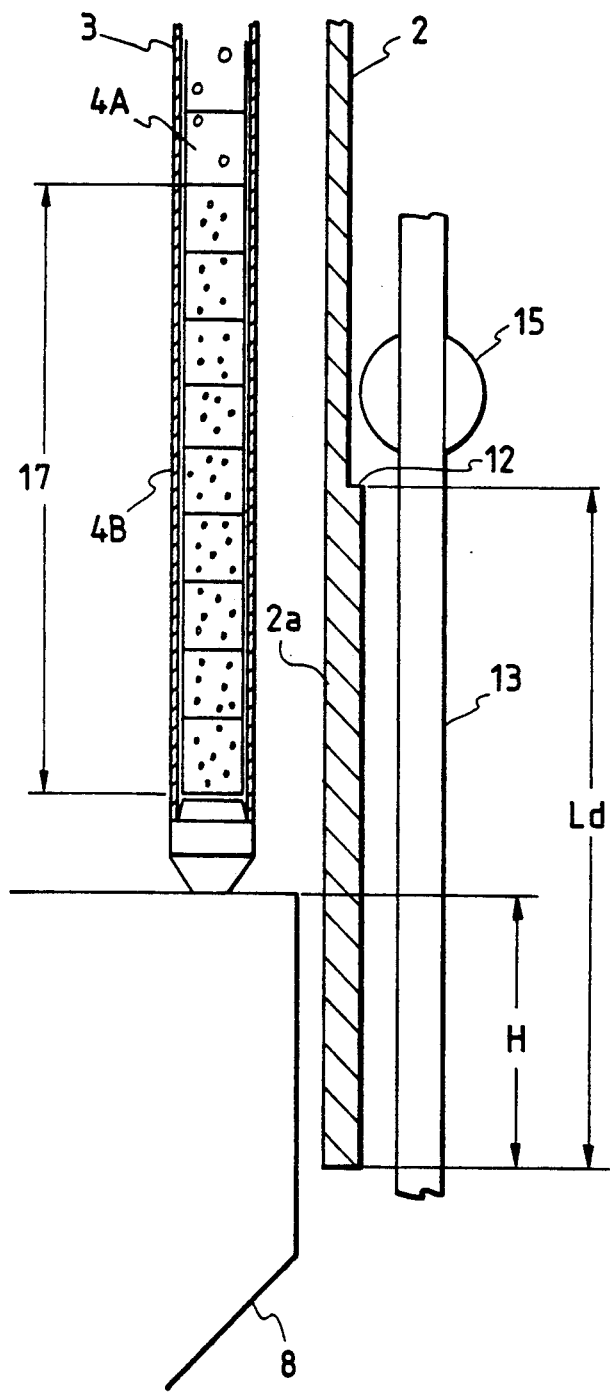
FIG. 5 is a partially enlarged sectional view in the vicinity of the natural uranium region in FIG. 1.
Figure 6:
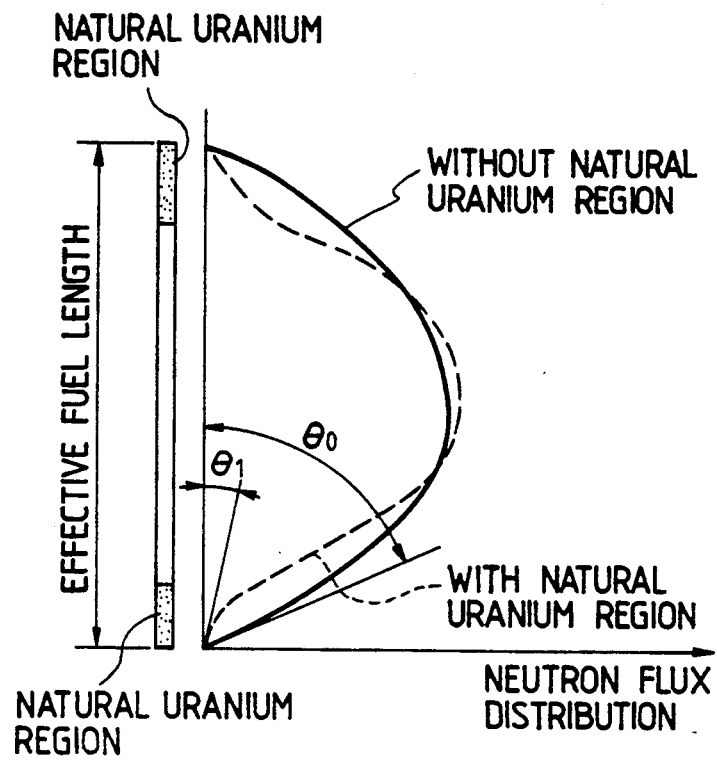
FIG. 6 is a graph representing characteristics of neutron flux distribution in an axial direction of the fuel assembly.

First, the reason that the step portion 12 locates below the upper end of the natural uranium region 17 at the lower end portion of the effective fuel length region is explained referring to FIGS. 5 and 6. The fuel assembly 1 of the present embodiment has the natural uranium regions both at the upper end portion and the lower end portion of the effective fuel length region respectively as illustrated in FIG. 6. The reasons of providing the natural uranium regions are (1) preventing neutron leakage in reactor operation, (2) reducing unused uranium existing in a spent fuel assembly when it is unloaded from the reactor core. That means, fast neutrons which are generated by a nuclear fission of fissile materials in the fuel rod and thermal neutrons which are generated by moderation of the fast neutrons by the moderator leak outside from both the upper end portion and the lower end portion of the fuel assembly. The leakage of the above described neutrons is proportional to a gradient of the neutron flux distribution. Referring to FIG. 6, the above described effects of (1) and (2) by the natural uranium region is explained. The fuel assembly without the natural uranium regions has a large gradient $\theta_0$ in the neutron flux distribution as shown by a solid line and large neutron leakage, while the fuel assembly with the natural uranium regions has a reduced gradient $\theta_1$ in the neutron flux distribution as shown by a dashed line and reduced leakage of the neutrons such as thermal neutrons.

The arrangement of the step portion 12 to the natural uranium region 17 has an effect to increase the above described effects, (1) and (2), of the natural uranium, and has not any other negative effects. On the other hand, when the step portion 12, which is the upper end of the lower thick wall region 2a, locates above the natural uranium region 17, for example referring to FIG. 6, in a phenomenon called a parasitic absorption of neutron by the channel box 2 is generated. That means, the quantity of neutrons absorbed by the channel box is increased. The neutrons are necessary for causing the nuclear fission of fissile material for heat generation. Accordingly, the wall thickness of the channel box 2 at the region having high neutron flux must be thinned. By locating the step portion 12 below the upper end of the natural uranium region 17, the above described condition is satisfied. Above the natural uranium region 17, the neutron absorption by the channel box 2 is reduced because of existence of the middle portion of the side wall 2c having thin walls. Consequently, neutron utilization factor in the fuel assembly 1 is improved and fuel economy is increased.

The arrangement of the step portion 12 within the natural uranium region 17 does not disturb effective burning of both U-235 in natural uranium and U-238 in natural uranium after converting to Pu-239. That is, conversion of U-238 to Pu-239 can be increased because the existence of the thick wall region 2a at the lower portion of the channel box 2 has an exclusive effect of the coolant, while cooling water in the boiling water reactor has also a function as a moderator, the quantity of the moderator is decreased. The above described decrement of the moderator causes increment of fast neutrons. Accordingly, the burning of uranium after converting U-238 to Pu-239 is, although slightly, increased.

Next, behavior of the fuel assembly 1 in an earthquake is explained hereinafter.

Figure 7:
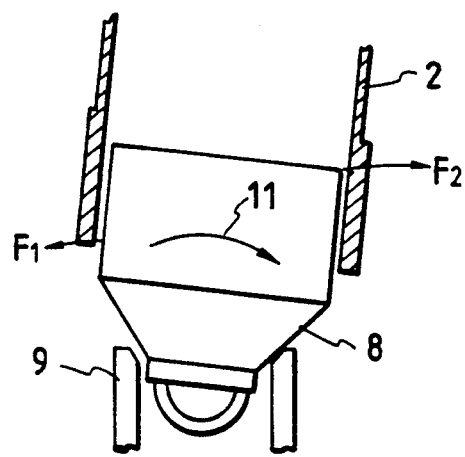
FIG. 7 is a schematic partial cross section for explanation on the lower tie plate movement in an earthquake.
Figure 8:
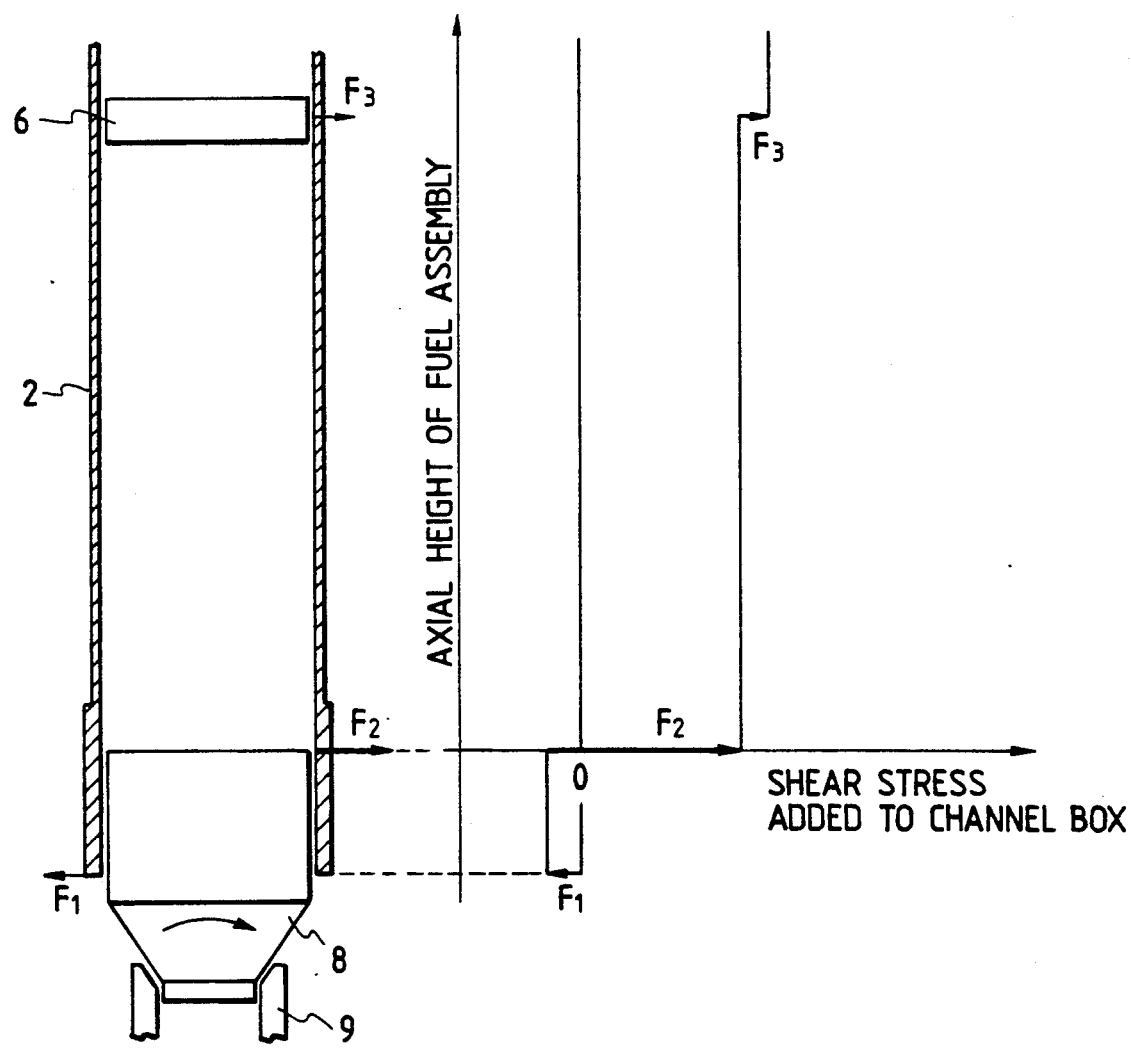
FIG. 8 is a schematic illustration for explanation on shear stress which is applied to the channel box in an earthquake.

The lower tie plate 8 supported by the fuel support member 9 rotates as indicated by the arrow 11 in FIG. 7 at an earthquake. At that time, the upside of the lower tie plate 8 adds a large force to the channel box 2. Reversely, the lower end of the channel box 2 receives a reverse force, and the channel box 2 rotates in a condition fitting with the lower tie plate 8. A result of analysis of the above described behavior along the full length of the fuel assembly is illustrated in FIG. 8 (illustrated until the lowest first fuel spacer). Shear stress effecting to the channel box 2 is locally generated inside of the channel box 2, and causes remarkable large stress to the channel box 2. The above described stress becomes especially large at the location where the channel box 2 collides against the upside of the lower tie plate 8. Nevertheless, the channel box 2 relating to the present embodiment has thick walls all through the circumference at the lower thick wall region 2a, and moreover, the step portion 12 locates above the upside of the lower tie plate 8. Consequently, a less stress is generated than the stresses generated at each of the channel boxes in the fuel assemblies disclosed in FIG. 2 of JP-B-1-13075 (1989), U.S. Pat. Nos. 3,715,274, 4,749,543, and 4,749,544. The previously disclosed fuel assemblies do not have the channel box in which the lower thick wall region locates above the upside of the lower tie plate. In accordance with the channel box disclosed in JP-A-1-227991 (1989), the step portion between the lower thick wall region and the middle portion of the side wall locates at the same level as the upside of the lower tie plate and the upside of the lower tie plate collides against the upper end of the lower thick wall region in an earthquake. Consequently, a large stress concentration occurs at the step portion where the wall thickness suddenly alters.

In accordance with the channel box in the present embodiment, the step portion 12 locates at above the upside of the lower tie plate 8 and the stress concentration at the step portion 12 is moderated by about 5% less than the channel box disclosed in JP-A-1-22799 (1989).

The inventors studied quantitatively the suppressive effect of a gap formed between the channel box 2 and the lower tie plate 8 to the coolant leakage flow in the present embodiment. The result of the study is explained hereinafter referring to FIGS. 9 and 10.

A majority of the coolant which entered the coolant paths formed in the channel box 2 through the lower tie plate 8 ascend upward with being heated as previously described, and exit from the upper tie plate 7. The rest of the coolant entered into the coolant paths flow out from the fuel assembly 1 through the gap formed between the channel box 2 and the lower tie plate 8.

Figure 9:
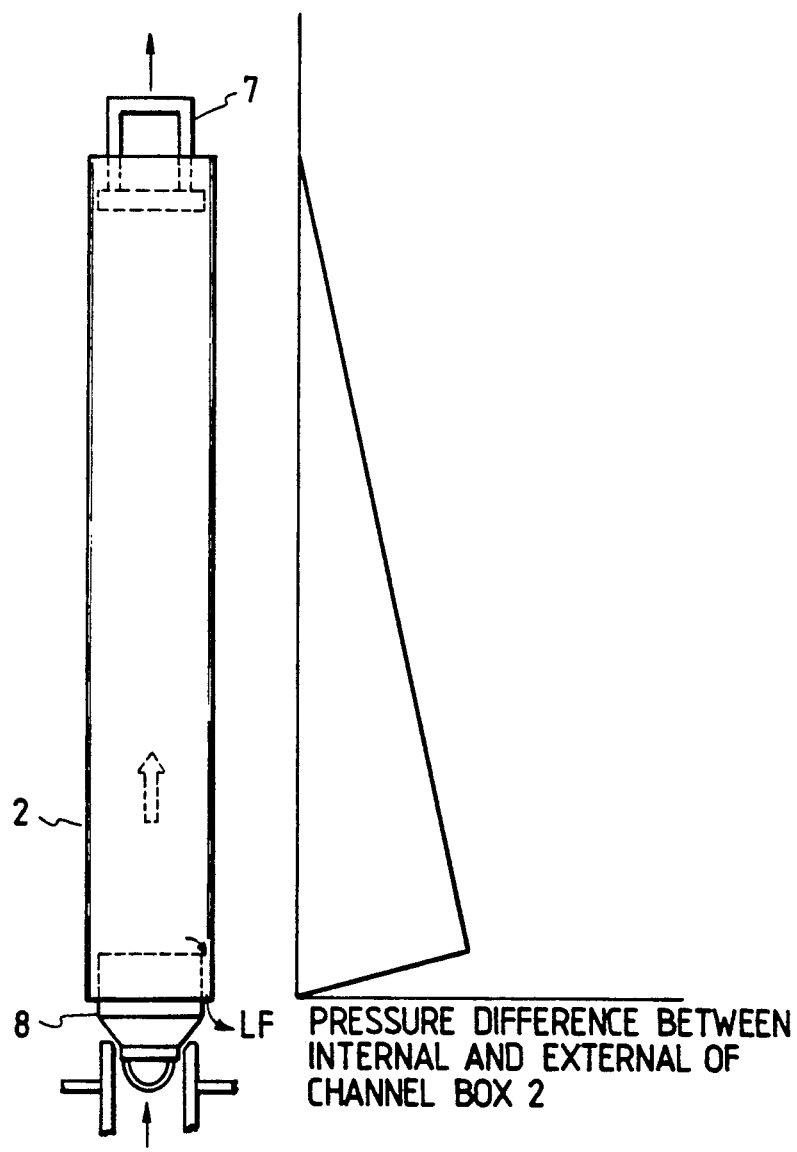
FIG. 9 is a schematic illustration for explanation on distribution of pressure difference between internal and external of the channel box in the axial direction.

A space (water gap) formed at the outside of the channel box 2, that is, among mutual adjacent fuel assemblies 1 has low pressure. Accordingly, the channel box 2 is in a condition of being pressurized internally. The pressure difference between interior and exterior of the channel box 2 becomes maximum at the upside location of the lower tie plate 8 and reduces gradually as ascending upward (FIG. 9). By an effect of the pressure difference, the channel box 2 creepingly deforms outward. And, the creeping deformation increases depending on increment of burn up of the fuel assembly. The increment of the creeping deformation increases the coolant leakage from the gap formed between the channel box 2 and the lower tie plate 8. Constant coolant leakage as possible through a fuel cycle is preferable, because, the leakage flow influences the critical power of the fuel rod which is important in designing of the fuel assembly.

Figure 10:
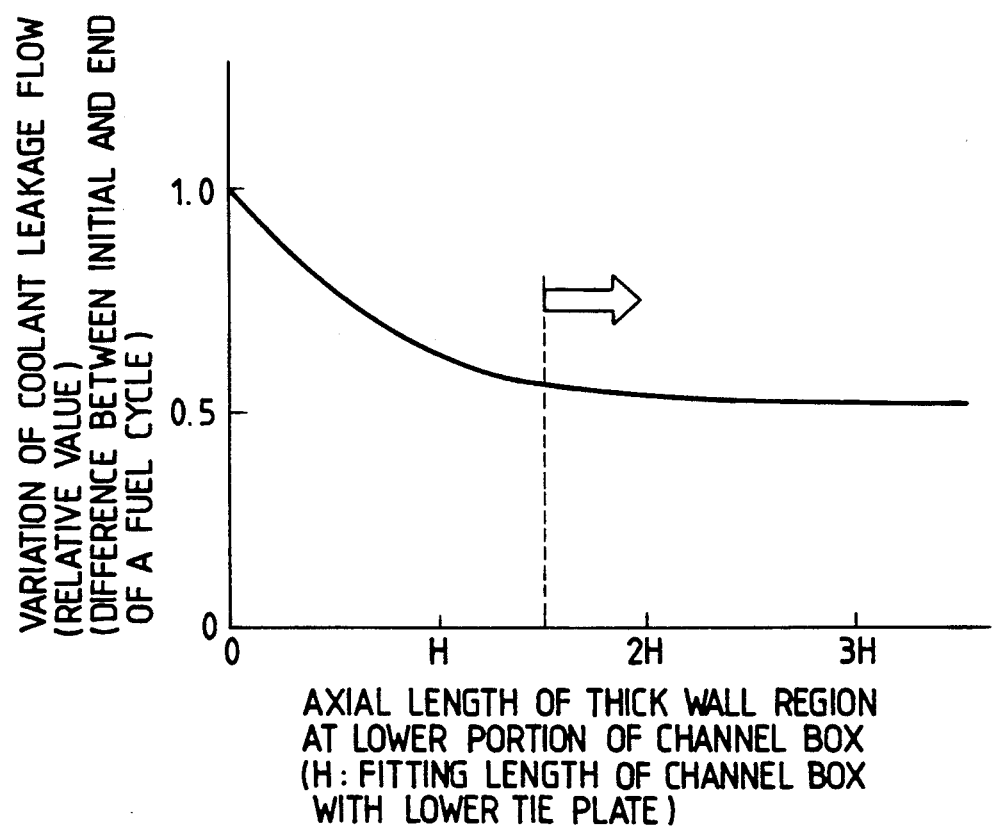
FIG. 10 is a graph representing characteristics of coolant leakage flow variation depending on axial length of the thick wall region at lower portion of the channel box.

Variation of the coolant leakage flow (difference between the coolant leakage flow at initial of a fuel cycle and the flow at end of the fuel cycle) is illustrated in FIG. 10. FIG. 10 illustrates an altering characteristics of the coolant leakage flow variation depending on the axial location of the step portion 12 of the channel box 2 as a parameter. That is, FIG. 10 illustrates changing of the coolant leakage flow variation depending on the axial length H (refer to FIG. 5) of the fitting of the channel box 2 with the lower tie plate 8 at assembling of the fuel assembly (burn up 0 Gwd/t). As FIG. 10 reveals, the coolant leakage flow variation becomes nearly constant all through a fuel cycle when the axial length of the lower thick wall region 2a is at least 1.5 H. The coolant leakage flow variation with the axial length of the lower thick wall region 2a of 1.5 H is almost 90% of the variation of the case when the thick wall region is extended through whole axial length of the channel box 2A. Accordingly, the axial length of the lower thick wall region 2a at least 1.5 H is preferable. In accordance with FIG. 5, the axial length of the lower thick wall region is almost 3 H. Generally speaking, the H is about 5-6 cm.

Control rods for regulating the nuclear reactor power are inserted among the fuel assemblies 1 loaded in the reactor core. In FIG. 5, the numeral 13 is the control rod. The control rod 13 has a cruciform cross section having four blades which extend four directions separately from the axial center of the control rod 13. The roller 15 is furnished at the upper end portion of the each blade rotatably. The roller 15 rotates by contacting on the external surface of the channel box 2 when the control rod 13 moves up and down. Consequently, the control rod 13 moves up and down smoothly. FIG. 5 illustrates a state of condition when the control rod 13 is withdrawn to the lowest position of the withdrawable range. The step portion 12 is furnished at a position avoiding interference with the roller 15. Accordingly, the fuel assembly 1 of the present embodiment is usable with the conventional control rod 13 without any modification. Because of the channel box 2 having the thin wall middle portion of the side wall 2c between the corner portions 2b, a following effect is obtained. That is, in the cross section of the channel box 2, the external surface of the middle portion of the side wall 2c locates more inner side of the channel box 2 than the external surface of the corner portion 2b. Consequently, a gap width between the middle portion of the side wall 2c and the side wall of the control rod 13 blade is larger than a gap width between the corner portion 2b and the control rod 13 blade. Accordingly, the allowable quantity of deformation at the middle portion of the side wall 2c toward outside increases, and an interference between the channel box 2 and the control rod 13 can be avoided. Also, the channel box 2 does not have any negative effect to operation of control rod 13 inserted among the fuel assemblies 1.

The channel box 2 relating to the present embodiment can be applied to both the fuel assembly having a 8 by 8 matrix of fuel rods and the fuel assembly having a 10 by 10 matrix of fuel rods.

Figure 11:
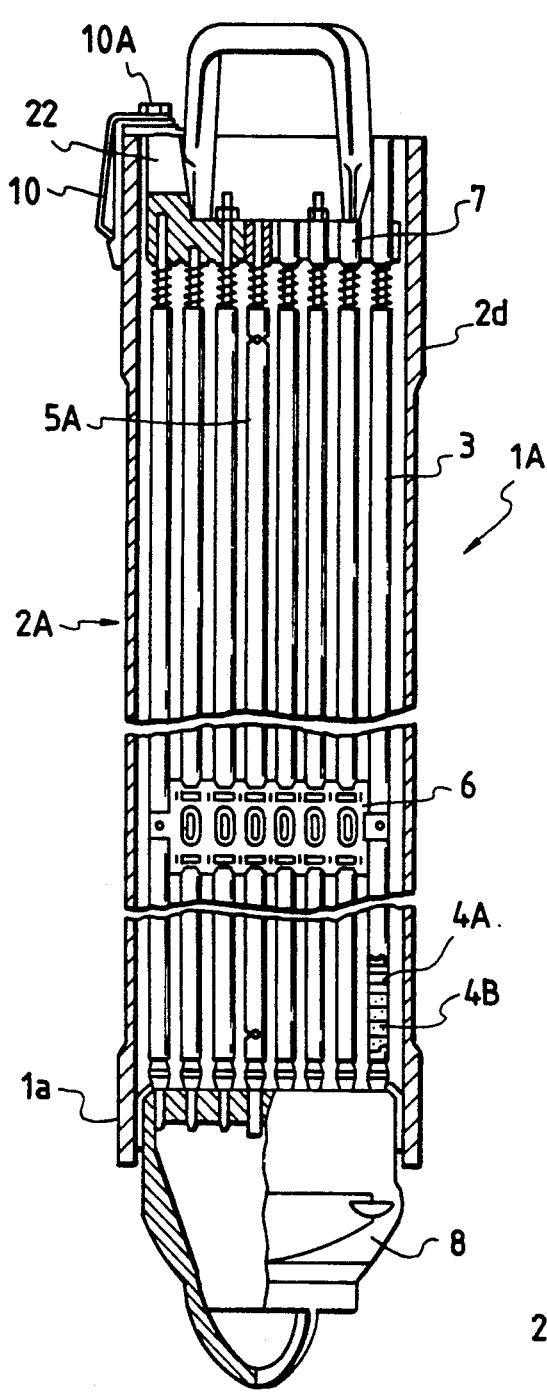
FIG. 11 is a vertical cross section of a fuel assembly relating to other embodiment of the present invention.
Figure 12:
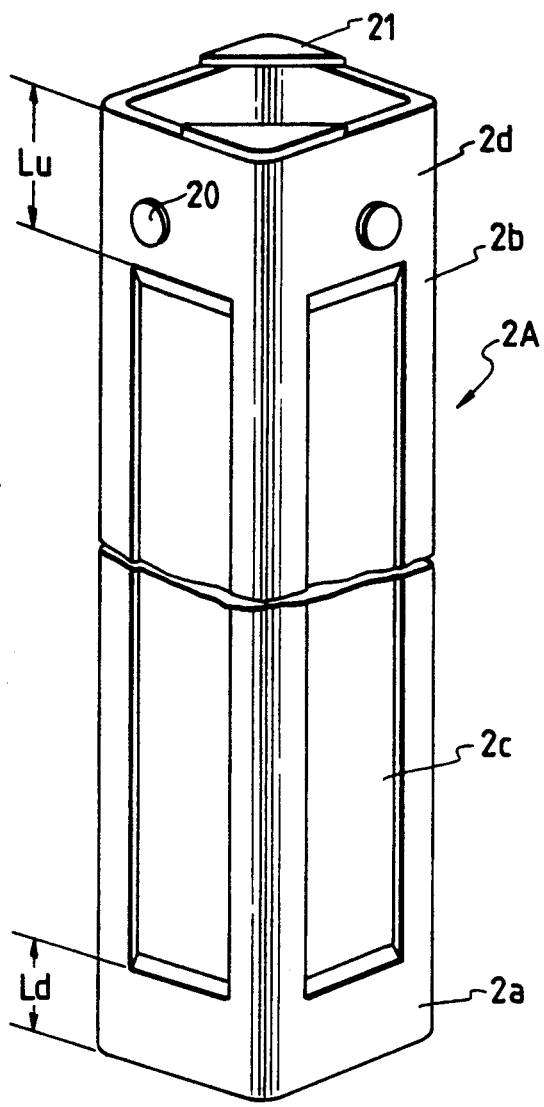
FIG. 12 is a perspective view of the channel box in FIG. 11.

A fuel assembly relating to the other embodiment of the present invention is illustrated in FIG. 11. The fuel assembly 1A of the present embodiment comprises the channel box 2A having the upper thick wall region 2d in addition to the lower thick wall region 2a, thick wall corner portion 2b and thin wall middle portion of the side wall 2c. The fuel assembly 1A has the same structure as the previously described fuel assembly 1 except the channel box 2A. Detailed structure of the channel box 2A is illustrated in FIG. 12. The channel box 2A can be considered to have a structure in which the upper thick wall region 2d is added to the same structure as the channel box 2. The upper thick wall region 2d has an uniform wall thickness all through the circumference of the channel box as same as the lower thick wall region 2a. The wall thickness of the upper thick wall region 2d is the same as the wall thickness of the corner portion 2b. In accordance with the channel box 2A, cross sections of both the lower thick wall region 2a and the upper thick wall region 2d have the shape illustrated in FIG. 4, and a cross section of the channel box including the middle portion of the side wall 2c has the shape illustrated in FIG. 3. The axial length of the upper thick wall region 2d is Lu from the upper end of the channel box 2A. At the upper end of the channel box 2a, clips 21 are furnished.

Figure 13:
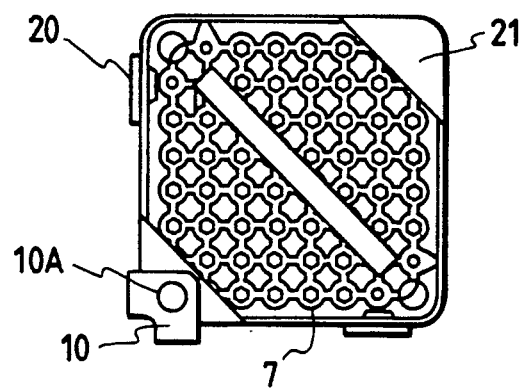
FIG. 13 is a top view of the fuel assembly in FIG. 11.

The channel box 2A is fixed to the upper tie plate 7 at the upper end in a condition in which the triangle shape clips 21 are respectively fixed at two diagonal corners of the upper end as illustrated in FIG. 13. That means, the clip 21 contacts with surface of the post 22 (FIG. 11) furnished at corners of the upper tie plate 7 by covering of the channel Box 2A. The channel fastener 10 is arranged at the corner located with one of the clips 21, and is fixed to one of the posts 22 with the screw 10A. The clip 21 between the channel fastener 10 and the post 22 is fixed to the post 22 of the upper tie plate 7 with the screw 10A. Fixing of the channel box and the channel fastener in the above described manner is applied to the previously described fuel assembly 1 as well. The channel spacer 20 is fixed at the upper thick wall region 2d (FIG. 12).

Figure 14:
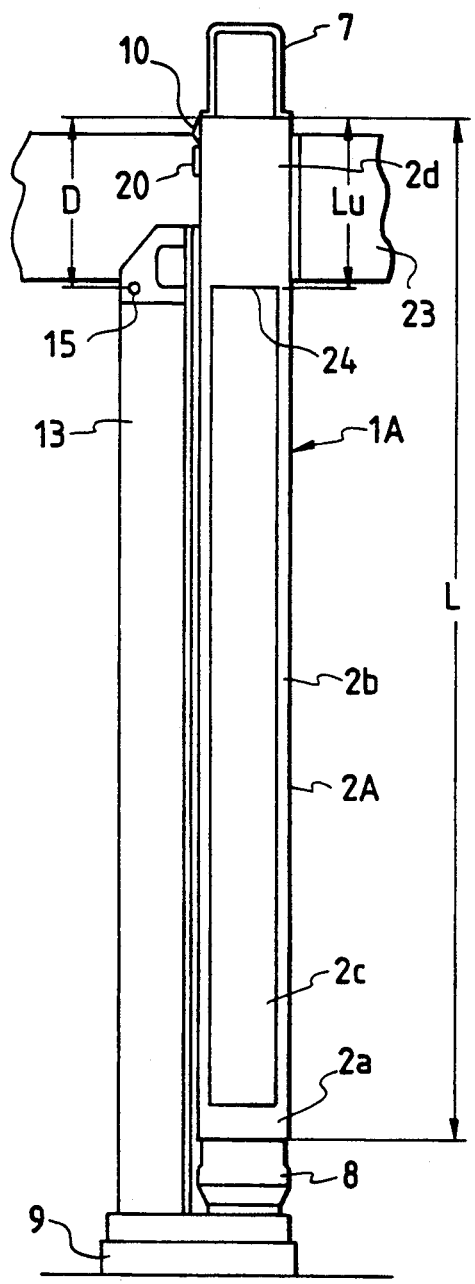
FIG. 14 is a schematic illustration for explanation on installing condition in a reactor core of the fuel assembly in FIG. 11.

The fuel assembly 1A is supported by insertion of its lower tie plate 8 into the fuel supporting metal fitting 9 as illustrated in FIG. 14. The upper end of the fuel assembly 1A is inserted into a grid of the upper grid plate 23 of the reactor core. One fuel supporting metal fitting 9 supports each lower tie plates 8 of the adjacent four fuel assemblies 1A surrounding the control rod 13. Each of the upper ends of the four fuel assemblies 1A is inserted into one of grids of the upper grid plate 23 of the reactor core. Each of the channel fasteners 10 of the four fuel assemblies 1A contacts each other, and horizontally presses the upper end portion of each fuel assemblies 1A, that is, the upper thick wall region 2d of the channel box 2A, toward the upper grid plate 23 of the reactor core. That means, the upper thick wall region 2d contacts with the upper grid plate 23 of the reactor core. The channel spacer 20 illustrated in FIG. 12 acts as a back up for an occasion of the channel fastener 10 failure.

The fuel assembly 1A has the same effect as the previously described fuel assembly 1 obtains.

Further, the fuel assembly 1A is able to solve the problems existing in the fuel assembly 1 by having the upper thick wall region 2d.

Each of fuel assemblies 1 in a condition being loaded in the reactor core presses each other with each channel fasteners 10 as previously described. A reaction force is added in an earthquake to planes contacting with the upper grid plate 23 in the reactor core and the fixing portion of the channel spacer 20 at the upper end portion of the channel box 2. Owing to vibration in the earthquake, two fuel assemblies out of the four fuel assemblies 1 being arranged in the grids of the upper grid plate 23 in the reactor core move toward the other two fuel assemblies. Consequently, the elastic channel fasteners 10 of the each fuel assemblies are compressed, and the each channel spacers 20 collides each other. Because of the fixing of the channel fasteners 10 at the thin middle portion of the side wall 2c, a large stress is generated at the fixing portion of the channel fasteners 10 by the above described collision. When the stress becomes too large, there is a possibility to cause cracks near the fixing portion.

The fuel assembly 1A is able to moderate the previously described generation of the stress concentration at the fuel assembly 1. In accordance with the fuel assembly 1A, the upper thick wall region 2d is furnished at the upper end portion of the channel box 2A which contacts with the upper grid plate 23 in the reactor core, and accordingly, the reaction force added to the fuel channel box 2A in an earthquake can be born by the whole side wall of the upper thick wall region 2d.

Consequently, local stress and deformation caused in the channel box 2A are moderated. Further, owing to furnishing of the channel spacer 20 at the upper thick wall region 2d, local stress at the fixing portion of the channel spacer 20 can be moderated to less than a half.

Next, determination of the axial length of the upper thick wall region 2d of the channel box 2A is explained.

Figure 15:
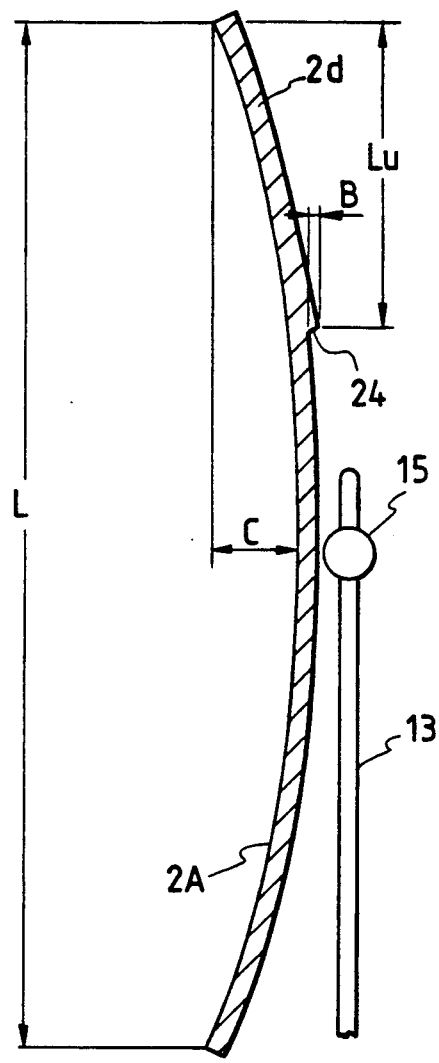
FIG. 15 is a schematic illustration for explanation on deformation state of the channel box in an earthquake.

First, a case considering deflection of the channel box 2A is explained referring to FIG. 15.

FIG. 15 is a schematic illustration of an axial fitting of a vertical cross section of one side of the channel box 2A with the control rod 13. The channel box 2A forms a guide plane for both inserting and withdrawing operations of the control rod 13 among the fuel assemblies 1A. And, because of a long body, the channel box 2A is allowed to have the deflection C in manufacturing process. In consideration of the above described situation, it is necessary that the upper thick wall region 2d (wall thickness at the corner portion = wall thickness at the flat portion) locates within a range not to protrude toward the control rod 13 side beyond the deflection at the middle portion of the channel box 2A.

Generally speaking, deflection of a long body is allowed to the extent within 0.1% of full length of the long body. When the above described allowance is applied to the channel box 2A, the axial length Lu of the upper thick wall region 2d which is necessary for not protruding the step portion 12 at the upper thick wall region 2d toward the control rod side beyond the middle portion of the channel box 2A can be calculated by the following equation where Z is a ratio of the axial length LU to L which is the axial full length of the channel box 2A.

$$Z = LU/L \quad (1)$$

$$Z = (\tfrac{1}{2}) \pm (\tfrac{1}{2})(B/C)^{\tfrac{1}{2}} \quad (2)$$

Currently, the channel box having four meters of L is generally used for the fuel assembly. In the present embodiment, the L of the channel box 2A is about four meters. When the L is four meters, C becomes about 4 millimeters. And, the step difference B on exterior surface of the channel box 2A at the corner portion 2b and the flat middle portion 2c of the side wall is generally about 1 millimeter.

In accordance with the above equation (1) and (2), it is revealed that the preferable axial length Lu of the upper thick wall region 2d of the channel box 2A is within a range of 25% of the full length L of the channel box 2A. When the Lu is within 25% of the L, both inserting and withdrawing operations of the control rod 13 among the fuel assemblies 1A are not influenced with any undesirable effect. And, the above Lu does not decrease substantial function of uneven surface of the channel box 2A.

Nevertheless, although the allowable percentage varies depending upon wall thickness specification/axial length as previously described, the upper thick wall region 2d is preferably arranged toward the upper end portion of the channel box 2A as possible in view of other requirement.

That is, determination of the axial length of the upper thick wall region 2d relating to interference with the roller 15 of the control rod 13 is explained referring to FIG. 14.

FIG. 14 illustrates a state when the control rod 13 is fully inserted among the fuel assemblies 1A. External surface of the channel box 2A forms a guide plane for up and down moving of the control rod 13, and accordingly, location of the upper thick wall region 2d is preferably determined not to interfere with the roller 15 when the control rod 13 is fully inserted. That means, the axial length Lu of the upper thick wall region 2d must be within the distance D from the upper end of the channel box 2A to the roller 15 when the control rod 13 is fully inserted. Consequently, the axial length Lu of the upper thick wall region 2d is preferably within 15% of the full length L of the channel box 2A.

Another factor to be considered in determination of the axial length Lu of the upper thick wall region 2d is explained referring to FIG. 11.

In view of improvement of neutron economy and fuel economy, the wall thickness of the channel box 2A is preferably made as thin as possible. Accordingly, the region of the channel box 2A except the lower thick wall region 2a and the upper thick wall region 2d has a thinner wall thickness at the middle portion of the side wall 2c than the wall thickness at the corner portion 2b in order to prevent the cross sectional area from being increased. In consideration of the above described condition, the upper thick wall region 2d preferably locates upward from the upper end of the effective fuel length portion of the fuel rod 3 illustrated in FIG. 11.

The length Lu of the upper thick wall region 2d of the channel box 2A within 10% of the full length L of the channel box 2A is preferable in order not to overlap with the effective fuel length portion.

Figure 16:
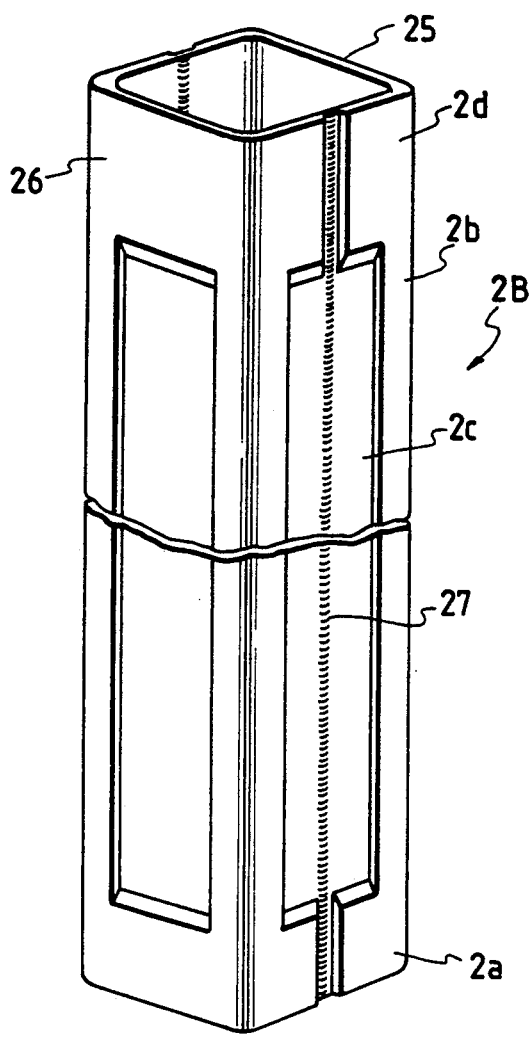
FIGS. 16 and 17 are perspective views of channel boxes relating to other embodiments of the present invention.

Other embodiment of the channel box is explained referring to FIG. 16.

The channel box 2B of the present embodiment is manufactured by welding two long members 25 and 26 having U shape cross section respectively to combine together for forming a long rectangular pipe. Wall thicknesses in the vicinity of the welding portion 27 at the middle portion of the side wall of both the lower thick wall region 2a and the upper thick wall region 2d are the same as the thin wall thickness at the middle portion of the side wall 2c. Accordingly, the wall thickness near the welding portion 27 becomes uniform all though the axial length, and determination of welding condition etc. is facilitated.

Figure 17:
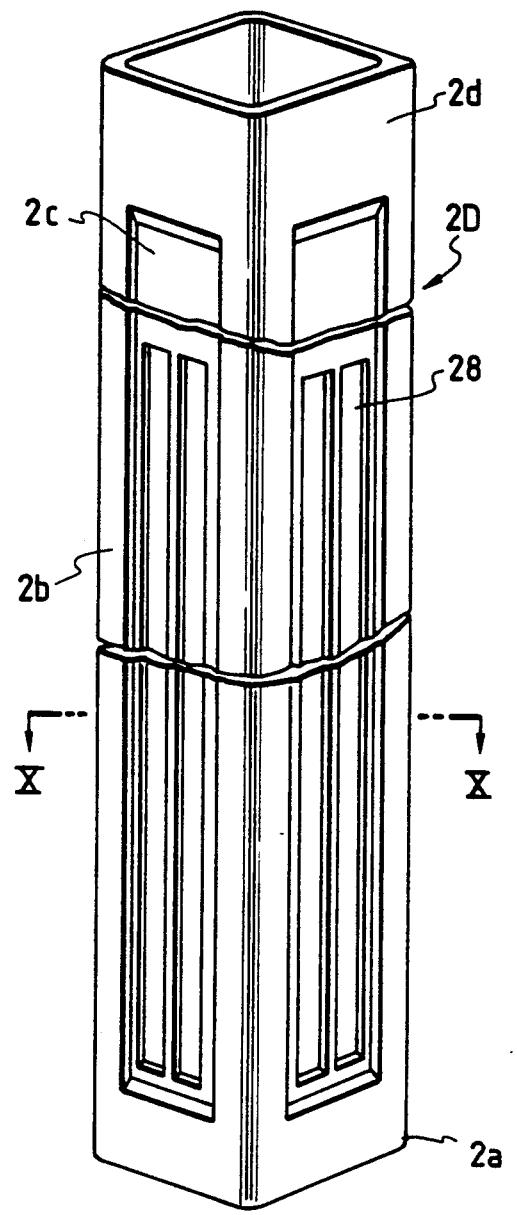
Figure 18:
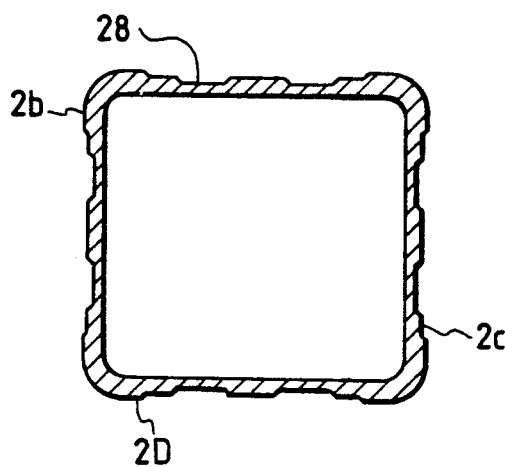
FIG. 18 is a cross section taken on line X—X in FIG. 17.

Moreover, other embodiment of the channel box is explained referring to FIGS. 17 and 18.

Referring to FIG. 17, the channel box 2D has a structure being formed the vertical grooves 28 at the thin middle portion of the side wall 2c. The vertical grooves 28 are totally formed eight, two on each sides of the channel box 2D, at the middle portion of the side walls as illustrated in FIGS. 17 and 18. The vertical grooves 28 are formed by eliminating the material from areas where bending moment and stress on the channel box 2D become minimum. The wall thickness at the portion where the vertical groove 28 is formed is thinner than the wall thickness at the middle portion 2c of the side wall. At the vertical groove 28 portion, a large amount of material is able to be eliminated without much increasing of deflection of the channel box wall under pressure loading. The channel box 2D is reduced in the quantity of the material by having a thinner wall thickness than the wall thicknesses of the channel boxes 2, 2A, and 2B, in the other embodiments, and accordingly, both the neutron economy and the fuel economy are further improved.

Besides, one of the eight grooves 28 is preferably furnished along the path where the roller 15 of the control rod 13 moves up and down. The reason is not to restrict the up and down movement of the control rod roller 15 by an adjacent channel box when the channel box deforms outward.

Further, the vertical groove 28 explained in the present embodiment is able to be applied to the channel boxes in the other embodiments.

What is claimed is:

1. A fuel assembly comprising
   an upper tie plate,
   a lower tie plate,
   a plurality of fuel rods, wherein each of an upper end and lower end of the fuel rod are supported by said upper tie plate and said lower tie plate respectively, having a natural uranium region containing natural uranium at a lower end portion, and a region containing enriched fissile material extending upwardly from the natural uranium region, and
   a channel box, which is fixed to said upper tie plate, surrounding a bundle of said fuel rods and said lower tie plate,
   characterized in that
   a wall thickness at a lower thick wall region of said channel box is thicker than a wall thickness at a region is disposed (1) upwardly from the lower thick wall region and (2) between corner portions of said channel box, and
   an upper end of said lower thick wall region is disposed (1) upwardly from an upper side of said lower tie plate and (2) downwardly from an upper end of said natural uranium region.

2. A fuel assembly as claimed in claim 1, wherein the upper end of said lower thick wall region is disposed at a position far from a lower end of said lower tie plate in a distance at least 1.5 times of an axial length between the upside of said lower tie plate and a lower end of said channel box in an assembled state.

3. A fuel assembly as claimed in claim 1, wherein a wall thickness at said corner portion of said channel box is thicker than a wall thickness at a middle portion of side wall disposed between said corner portions in a region upwardly from said lower thick walls region of said channel box.

4. A fuel assembly as claimed in claim 3, wherein the wall thickness at said lower thick wall region is the same as the wall thickness at said corner portion.

5. A fuel assembly comprising
   an upper tie plate,
   a lower tie plate,
   a plurality of fuel rods, wherein each of an upper end and lower end of the fuel rod are supported by said upper tie plate and said lower tie plate respectively, having a natural uranium region containing natural uranium at a lower end portion, and a region containing enriched fissile material extending upwardly from the natural uranium region, and
   a channel box, which is fixed to said upper tie plate, surrounding a bundle of said fuel rods and said lower tie plate,
   characterized in that
   a wall thickness at a lower thick wall region of said channel box is thicker than a wall thickness at a region disposed (1) upwardly from the lower thick wall region and (2) between corner portions of said channel box,
   an upper end of said lower wall region is disposed (1) upwardly from an upper side of said lower tie plate and (2) downwardly from an upper end of said natural uranium region, and
   a wall thickness at an upper thick wall region, formed at an upper portion of said channel box, is thicker than a wall thickness at a region disposed (1) between the upper thick wall region and said lower thick wall region and (2) between said corner portions of said channel box.

6. A fuel assembly as claimed in claim 5, wherein the wall thickness at said lower thick wall region and at said upper thick wall region are uniform in whole cross section at the regions.

7. A fuel assembly as claimed in claim 5, wherein the upper end of said lower thick wall region is disposed at a position far from a lower end of said lower tie plate in a distance at least 1.5 times of an axial length between the upside of said lower tie plate and a lower end of said channel box in an assembled state.

8. A fuel assembly as claimed in claim 5, wherein a wall thickness at said corner portion is thicker than a wall thickness at middle portion of side wall disposed between said corner portions of said channel box in a region between said lower thick wall region and said upper thick wall region of said channel box.

9. A fuel assembly as claimed in claim 8, wherein the wall thickness at said lower thick wall region and at said upper thick wall region are the same as the wall thickness at said corner portion.

10. A fuel assembly as claimed in claim 5, wherein channel spacers are furnished at said upper thick wall region.

11. A fuel assembly as claimed in claim 5, wherein an axial length of said upper thick wall region is at most 25% of an axial full length of said channel box.

12. A fuel assembly as claimed in claim 5, wherein the axial length of said upper thick wall region is at most 15% of the axial full length of said channel box.

13. A fuel assembly as claimed in claim 5, wherein the axial length of said upper thick wall region is at most 10% of the axial full length of said channel box.

14. A channel box having a lower thick wall region at a lower end portion and an upper thick wall region at an upper end portion, wherein a wall thickness at a corner portion is thicker than a wall thickness at middle portion of a side wall disposed between said corner portions in an axial region between said lower thick wall region and said upper thick wall region, wherein the wall thicknesses at said lower thick wall region and at said upper thick wall region are the same as the wall thickness at said corner portions.

* * * * *